United States Patent
Shu et al.

(10) Patent No.: US 12,552,406 B2
(45) Date of Patent: Feb. 17, 2026

(54) DUAL PATH ETHERNET-BASED SENSOR DEVICE FAULT MONITORING

(71) Applicants: Baidu USA LLC, Sunnyvale, CA (US); APOLLO INTELLIGENT DRIVING TECHNOLOGY (BEIJING) CO., LTD., Beijing (CN)

(72) Inventors: Guoli Shu, Sunnyvale, CA (US); Kedong Xu, Beijing (CN)

(73) Assignees: BAIDU USA LLC, Sunnyvale, CA (US); APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 509 days.

(21) Appl. No.: 18/000,206

(22) PCT Filed: Sep. 5, 2022

(86) PCT No.: PCT/CN2022/117133
§ 371 (c)(1),
(2) Date: Nov. 29, 2022

(87) PCT Pub. No.: WO2024/050674
PCT Pub. Date: Mar. 14, 2024

(65) Prior Publication Data
US 2024/0227844 A1  Jul. 11, 2024

(51) Int. Cl.
*H04L 49/351* (2022.01)
*B60W 60/00* (2020.01)

(52) U.S. Cl.
CPC ......... *B60W 60/001* (2020.02); *H04L 49/351* (2013.01)

(58) Field of Classification Search
CPC ........ H04L 49/351; H04L 12/28; H04L 12/50
USPC ................................. 370/329, 401, 402, 403
See application file for complete search history.

(56) References Cited

U.S. PATENT DOCUMENTS 8,073,777 B2 * 12/2011 Barry .................. H04L 63/0442
  705/50
12,245,036 B1 * 3/2025 Banerjee ............... H04W 12/72

\* cited by examiner

*Primary Examiner* — Dang T Ton
(74) *Attorney, Agent, or Firm* — WOMBLE BOND DICKINSON (US) LLP

(57) ABSTRACT

In an embodiment, an autonomous driving vehicle (ADV) processes a set of sensor data concurrently by both a first computing unit and a second computing unit, wherein the set of sensor data is generated by a sensor. The first computing unit formats the set of sensor data into a set of message data. The second computing unit determines whether the set of sensor data indicates a control path fault. The second computing unit reports the control path fault responsive to determining that the set of sensor data indicates the control path fault.

20 Claims, 8 Drawing Sheets

DUAL PATH ETHERNET-BASED SENSOR DEVICE FAULT MONITORING

CROSS-REFERENCE TO RELATED APPLICATIONS

This application is a National Stage of International Application No. PCT/CN2022/117133, filed Sep. 5, 2022, which is hereby incorporated by reference in its entirety.

TECHNICAL FIELD

Embodiments of the present disclosure relate generally to operating autonomous driving vehicles. More particularly, embodiments of the disclosure relate to dual path Ethernet-based sensor device fault monitoring.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensor devices, allowing the vehicle to travel with minimal human interaction or in some cases without any passengers.

The autonomous driving vehicles use sensor drivers in conjunction with the sensor devices to parse raw data generated by the sensor devices; publish the parsed raw data in a defined message data format; and send the message data to other autonomous driving software units for further processing. The sensor drivers also report sensor data path related faults such as data timeout, incomplete data, bad data, and etcetera.

SUMMARY

In a first aspect, there is provided a computer-implemented method for operating an autonomous driving vehicle, the method including:
processing a set of sensor data concurrently by both a first computing unit and a second computing unit, wherein the set of sensor data is generated by a sensor, the processing further comprising:
formatting, by the first computing unit, the set of sensor data into a set of message data;
determining, by the second computing unit, whether the set of sensor data indicates a control path fault; and
reporting, by the second computing unit, the control path fault responsive to determining that the set of sensor data indicates the control path fault.

In a second aspect, there is provided a non-transitory machine-readable medium having instructions stored therein, which when executed by a processor, cause the processor to perform the method in the first aspect.

In a third aspect, there is provided a system for operating an autonomous driving vehicle, including:
a processing device; and
a memory to store instructions that, when executed by the processing device cause the processing device to perform the method In a fourth aspect, there is provided a computer program product including a computer program, which when executed by a processor, cause the processor to perform the method in the first aspect.

With the technical solution of the present disclosure, the autonomous driving vehicle can effectively perform fault detection.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
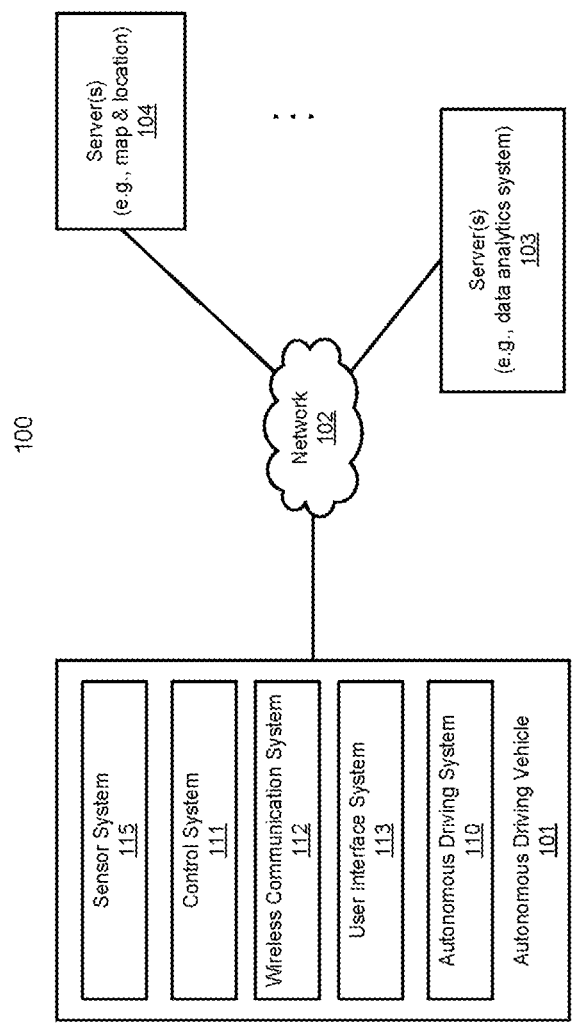
FIG. 1 is a block diagram illustrating a networked system according to one embodiment.

Various embodiments and aspects of the disclosures will be described with reference to the details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As discussed above, sensor drivers report sensor data path related errors such as data timeout, incomplete data, bad data, and etcetera. Sensor drivers, however, do not monitor link layer path and control path information. As such, the autonomous driving vehicle is unable effectively perform fault detection.

Disclosed herein is an approach that provides dual path fault monitoring for Ethernet-based sensor devices. The approach adds a sensor monitor module on a safety computing unit to monitor and report faults in the link layer and control path while the sensor drivers continue to publish data and report data path related errors. By adding the sensor monitor module, the autonomous driving vehicle continues to process sensor information in real-time using the sensor drivers while also monitoring the link layer and control path from the sensors.

According to one embodiment, an autonomous driving vehicle (ADV) concurrently processes a set of sensor data, generated by a sensor, by both a first computing unit and a second computing unit. The first computing unit formats the set of sensor data into a set of message data. The second computing unit determines whether the set of sensor data indicates a control path fault, and reports the control path fault accordingly.

In one embodiment, the ADV receives, at an Ethernet switch, the set of sensor data from the sensor and transmits, from the Ethernet switch, the set of sensor data to both the first computing unit and the second computing unit over a dedicated virtual LAN. In one embodiment, the autonomous driving vehicle includes an autonomous driving system that includes the first computing unit, the second computing unit, and the Ethernet switch.

In one embodiment, the first computing unit determines whether the set of sensor data indicates a data path fault, and reports the data path fault accordingly. In one embodiment, the first computing unit reports the data path fault to a central system monitor and the second computing unit reports the control path fault to the central system monitor.

In one embodiment, the second computing unit determines whether the set of sensor data indicates a link layer fault and reports the fault accordingly. In one embodiment, the second computing unit generates a set of sensor data statistics in response to evaluating the set of sensor data.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
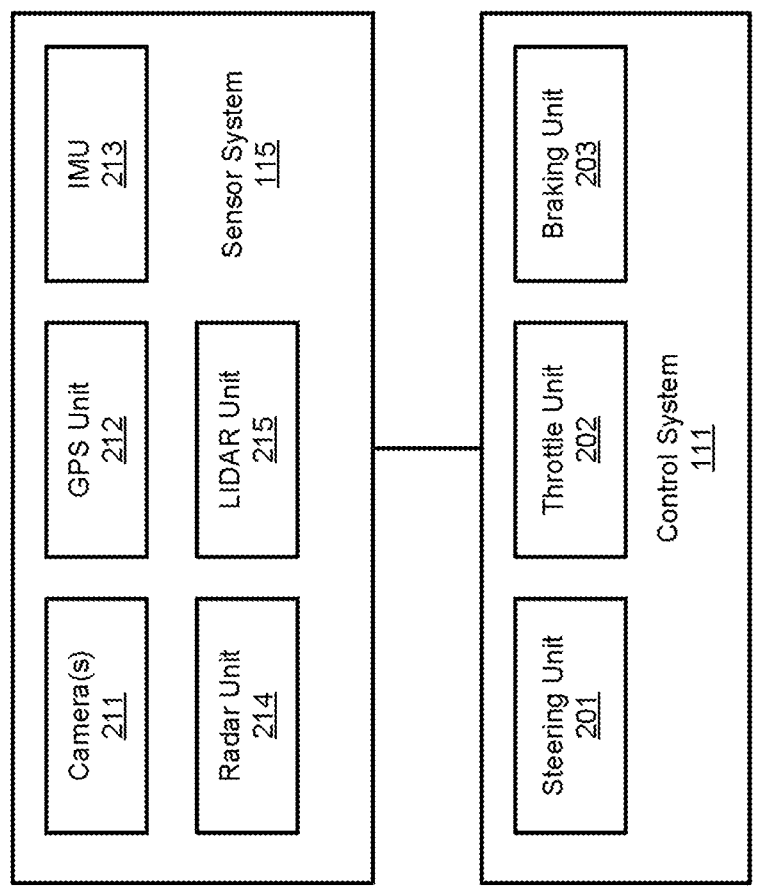
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3:
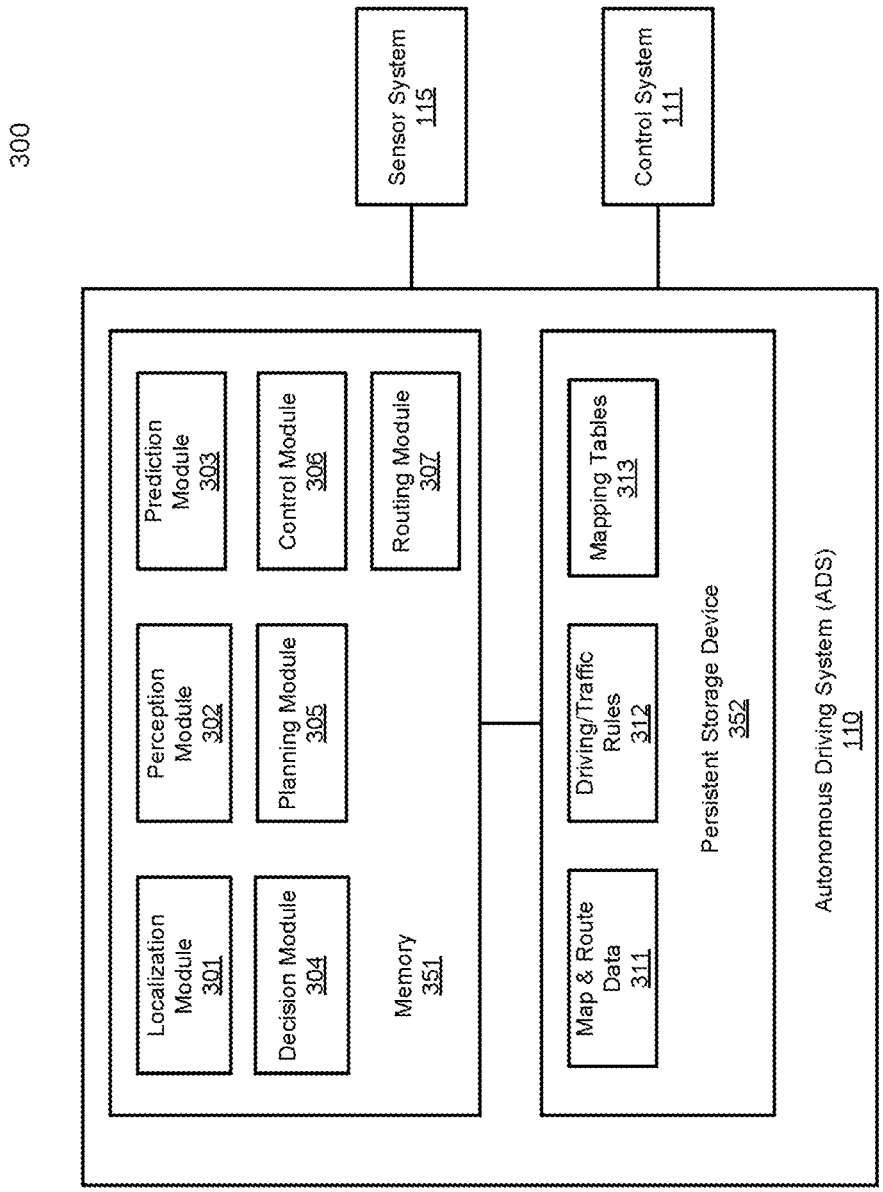
FIGS. 3 and 4 are block diagrams illustrating an example of an autonomous driving system used with an autonomous driving vehicle according to one embodiment.
Figure 4:
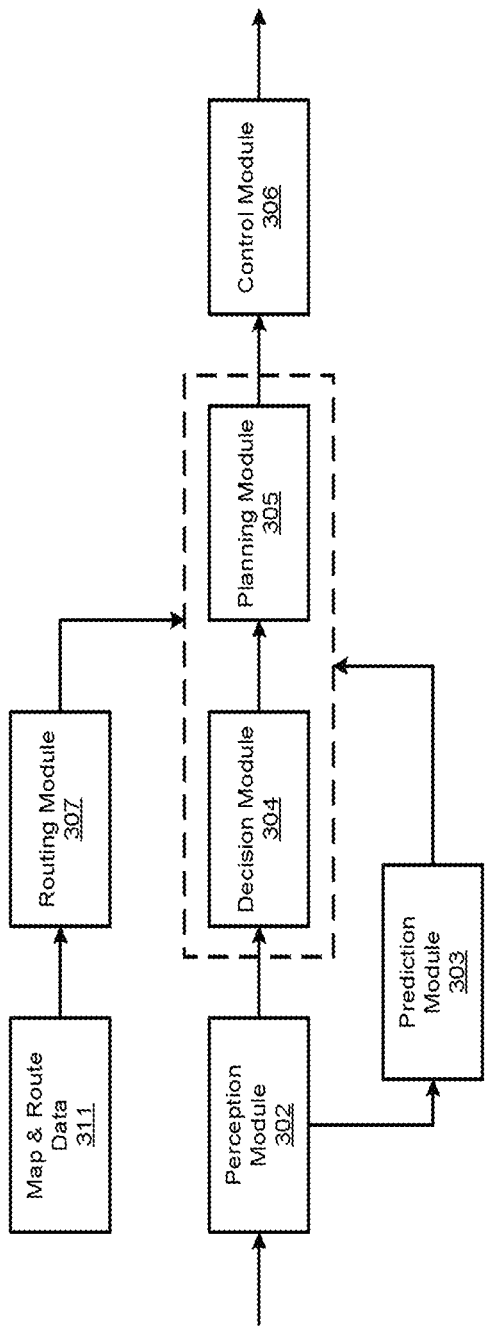

FIGS. 3 and 4 are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. ADS 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 5:
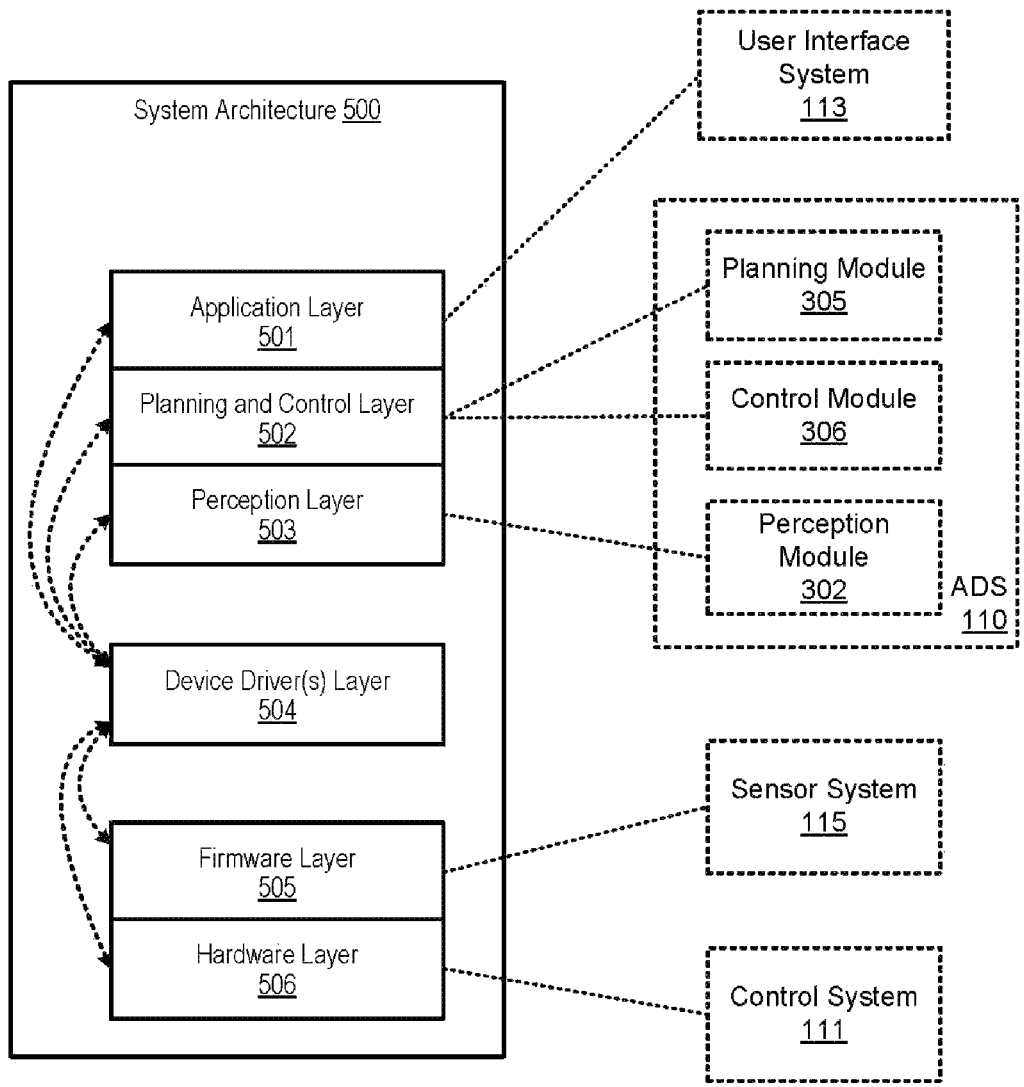
FIG. 5 is a block diagram illustrating system architecture for autonomous driving according to one embodiment.

FIG. 5 is a block diagram illustrating system architecture for autonomous driving according to one embodiment. System architecture 500 may represent system architecture of an autonomous driving system as shown in FIG. 1. Referring to FIG. 5, system architecture 500 includes, but it is not limited to, application layer 501, planning and control (PNC) layer 502, perception layer 503, driver layer 504, firmware layer 505, and hardware layer 506. Application layer 501 may include user interface or configuration application that interacts with users or passengers of an autonomous driving vehicle, such as, for example, functionalities associated with user interface system 113. PNC layer 502 may include functionalities of perception and planning system 110 and control system 111. Perception layer 503 may include functionalities of at least perception and planning system 110. Firmware layer 505 may represent at least the functionality of sensor system 115, which may be implemented in a form of a field programmable gate array (FPGA). Hardware layer 506 may represent the hardware of the autonomous driving vehicle such as control system 111. Layers 501-503 can communicate with firmware layer 505 and hardware layer 506 via device driver layer 504.

Figure 6:
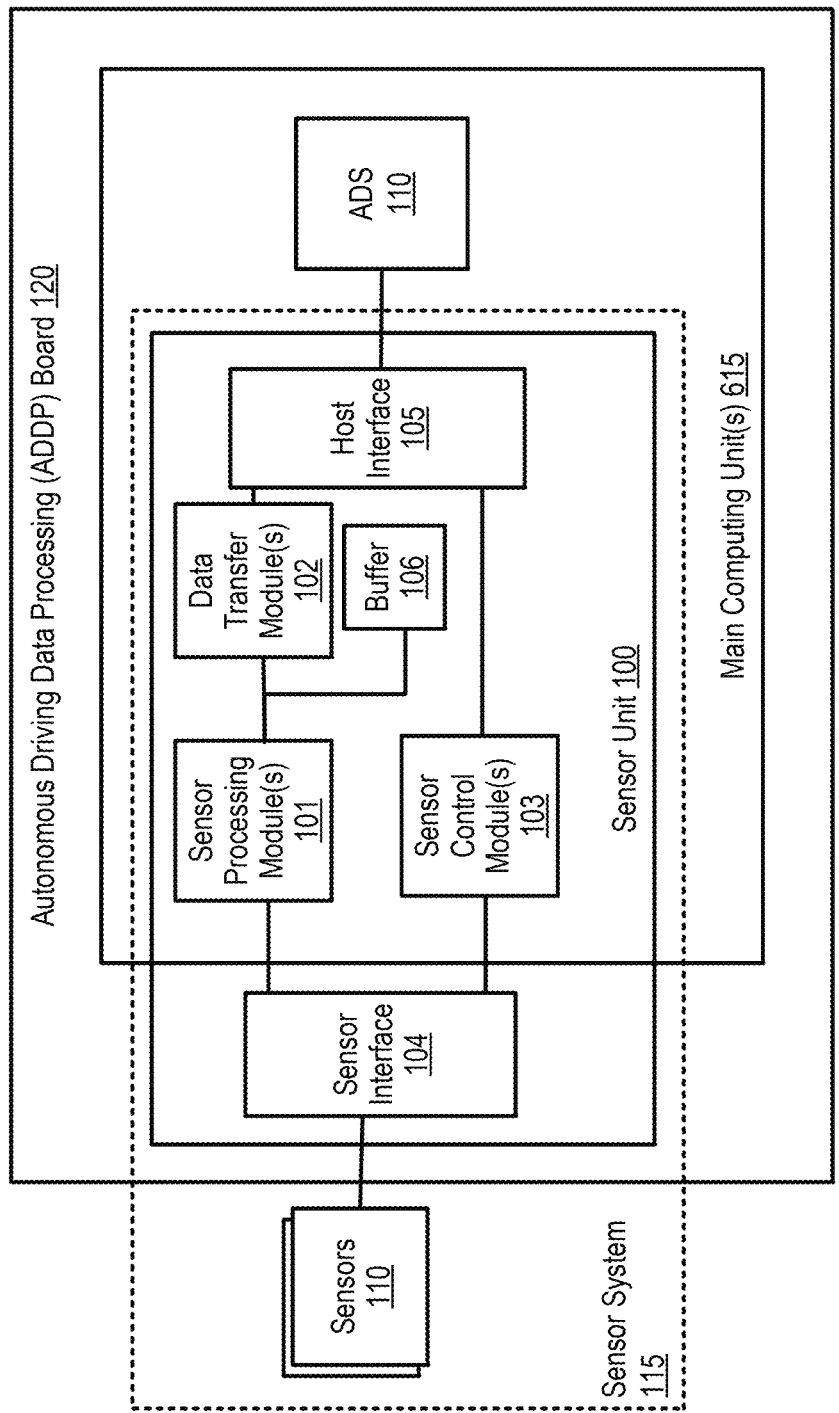
FIG. 6 is a block diagram illustrating an example of an autonomous driving data processing board according to one embodiment.

FIG. 6 is a block diagram illustrating an example of an autonomous driving data processing board according to one embodiment. Referring to FIG. 6, sensor system 115 includes a number of sensors 610 and a sensor unit 600 coupled to ADS 110. ADS 110 may include at least some of the modules as shown in FIG. 3. Sensor unit 600 may be configured, for example, in a form of an FPGA device or an ASIC (application specific integrated circuit) device. In one embodiment, sensor unit 600 includes, amongst others, one or more sensor data processing modules 601 (referred to herein as sensor processing modules), data transfer modules 602, and sensor control modules or logic 603. Modules 601-603 can communicate with sensors 610 via a sensor interface 604 and communicate with ADS 110 via host interface 605. In one embodiment, an internal or external buffer 606 may be utilized for buffering the data for processing.

In one embodiment, sensors 610 may include a GPS receiver/unit, an IMU, and a LIDAR unit. The GPS unit and IMU may be coupled together with a sensor unit 600 on a single FPGA, or ASIC, referred to as an inertial measurement unit (INS). In one embodiment, sensors 610 include a first IMU as a primary IMU and a second IMU as a redundant or backup IMU, which may be independently powered by separate power supply circuits (such as voltage regulators). The sensor processing module 601 may include logic to receive data from the GPS unit and the IMU and combine the data (e.g., using a Kalman filter) to estimate a location of the automated vehicle. The sensor processing module 601 may further include logic to compensate for GPS data bias due to propagation latencies of the GPS data.

In one embodiment, for the receiving path or upstream direction, sensor processing module 601 is configured to receive sensor data from a sensor via sensor interface 604 and process the sensor data (e.g., format conversion, error checking), which may be temporarily stored in buffer 606. Data transfer module 602 is configured to transfer the processed data to host system 110 using a communication protocol compatible with host interface 605. Similarly, for the transmitting path or downstream direction, data transfer module 602 is configured to receive data or commands from host system 110. The data is then processed by sensor processing module 601 to a format that is compatible with the corresponding sensor. The processed data is then transmitted to the sensor.

In one embodiment, sensor control module or logic 603 is configured to control certain operations of sensors 610, such as, for example, timing of activation of capturing sensor data, in response to commands received from host system (e.g., perception module 302) via host interface 605. ADS 110 can configure sensors 610 to capture sensor data in a collaborative and/or synchronized manner, such that the sensor data can be utilized to perceive a driving environment surrounding the vehicle at any point in time.

Sensor interface 604 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 605 may be any high speed or high bandwidth interface such as PCIe (peripheral component interconnect or PCI express) interface. Sensors 610 can include a variety of sensors that are utilized in an ADV, such as, for example, a camera, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. Similarly, an internal SIM module can be inserted onto a SIM socket of sensor unit 600. The serial interface such as UART can be coupled with a console system for debug purposes.

Sensors 610 can be any kind of sensors and provided by various vendors or suppliers. Sensor processing module 601 is configured to handle different types of sensors and their respective data formats and communication protocols. According to one embodiment, each of sensors 610 is associated with a specific channel for processing sensor data and transferring the processed sensor data between ADS 110 and the corresponding sensor. Each channel may include a specific sensor processing module and a specific data transfer module that have been configured or programmed to handle the corresponding sensor data and protocol.

In one embodiment, sensor processing modules parse raw data from sensor 610 and format the parsed raw data into messages that are sent to ADS 110 for further processing. In one embodiment, a monitoring system actively collects sensor information in various manners through available automotive standard compliant protocols, integrates plug-and-play distributed components, and communicates with flexible software application clients to achieve an open and safe monitoring mechanism. This may service a single chip and sensors architecture, or a heterogeneous integrated computing and sensor system. The monitoring system is based on a publisher/subscriber messaging system to allow components involved to freely communicate with each other regarding the operating status or controls.

ADDP board 620 includes main computing unit(s) 615, which include the hardware, software, firmware, etc. to perform the functions of sensor unit and ADS 110. Main computing unit(s) 615 may be in the form or combination of ASICs, FPGAs, CPUs, GPUs, processor accelerators, and other logic circuitry. As discussed in FIG. 7, the approach disclosed herein adds one or more safety computing units, for example, to ADDP board 620 to monitor the link layers and control paths of the sensor data and generate faults when errors are detected (see FIG. 7 and corresponding text for further details).

Figure 7:
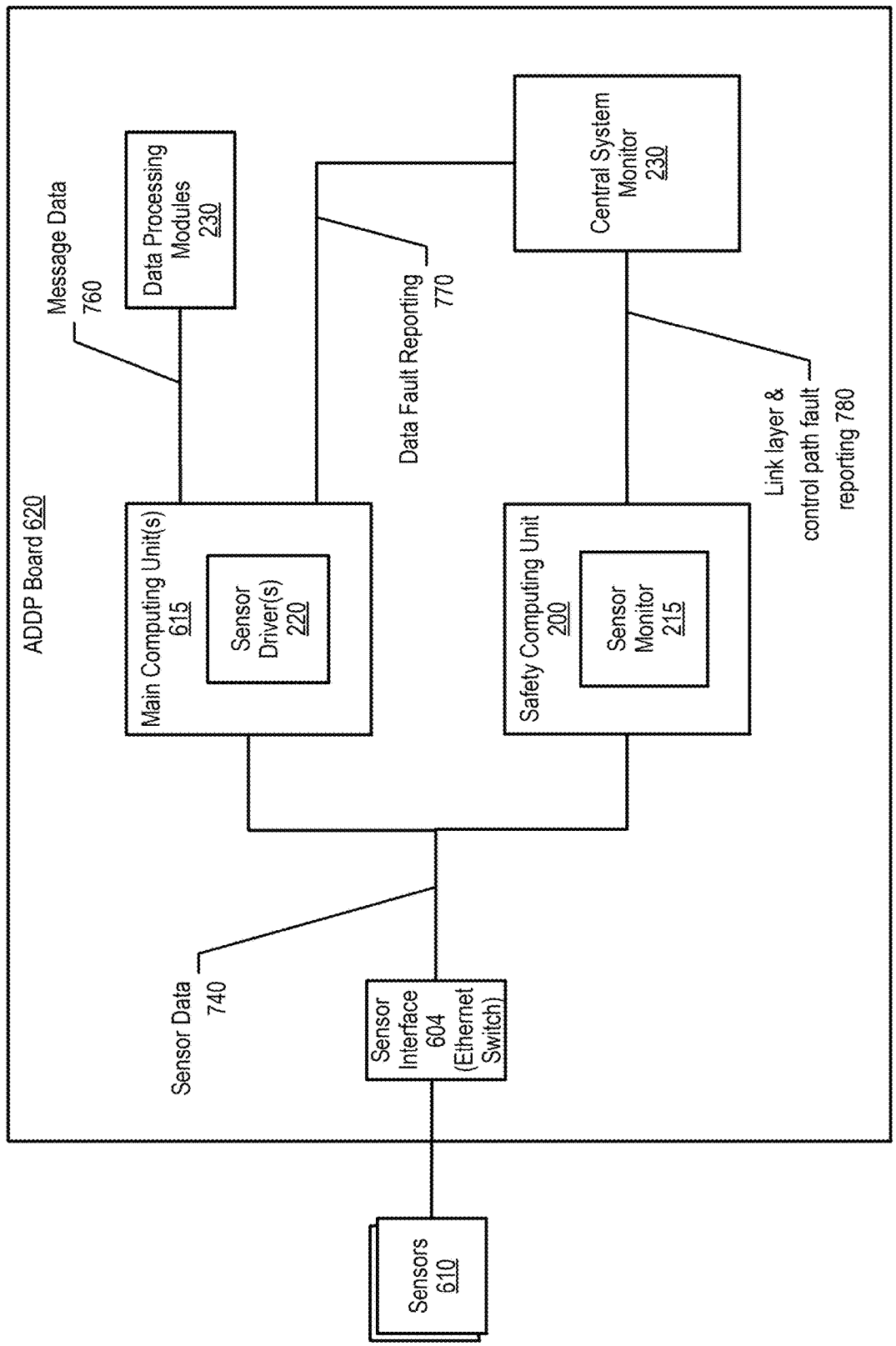
FIG. 7 is a block diagram illustrating an example of a dual path Ethernet-based sensor device fault monitoring system.

FIG. 7 is a block diagram illustrating an example of a dual path Ethernet-based sensor device fault monitoring system. FIG. 7 shows sensors 610 coupled to sensor interface 604, which is an Ethernet switch. Sensors 601 provide sensor data 740 to sensor interface 604. Sensor interface 604 is configured to send sensor data 740 to both main computing unit(s) 615 and safety computing unit 700. Main computing unit(s), include sensor driver(s) 720, which correspond to sensors 610. In one embodiment, sensor driver(s) 720 are part of device driver layer 504 shown in FIG. 5.

Sensor driver(s) 720 execute on main computing unit(s) 615, such as executing on sensor processing module(s) 601 shown in FIG. 6. Sensor driver(s) parse sensor data 740 and generate message data 760 from the parsed sensor data 740. Main computing unit(s) 615 send message data 760 to data processing modules 725, which may include one or more of modules 301-307 shown in FIG. 3. Main computing unit(s) 615 also check for data path faults and send data fault reporting 770 to central system monitor 730 as needed.

Safety computing unit 700 receives sensor data 740 and uses sensor monitor 715 to analyze the link layer and control path information. When safety computing unit 700 detects link layer and/or control path failures, safety computing unit 700 sends link layer and control path fault reporting 780 to central system monitor 730. Central system monitor 730 processes data fault reporting 770 and link layer and control path fault reporting 780, and takes corrective action accordingly (e.g., informing a driver of the ADV or sending a message to a remote monitoring service).

In one embodiment, central system monitor 730 generates a log that conveys various status parameters of a Global Navigation Satellite System (GNSS) receiver system, which includes receiver status and error words that include several flags specifying status and error conditions. When an error occurs (shown in the receiver error word), the receiver idles all channels, turns off the antenna, and disables the RF hardware as these conditions are considered to be fatal errors. The log includes a variable number of status words to allow for maximum flexibility and future expansion. In one embodiment, the GNSS sensor monitor parses the RXSTATUS packet and report errors such as DRAM error, Invalid Firmware error, ROM Status error, ESN Access error, Authorization code error, Supply voltage error, Temperature out of range error, MINOS Status error, PLL RF Status error, and/or NVM Status error.

Figure 8:
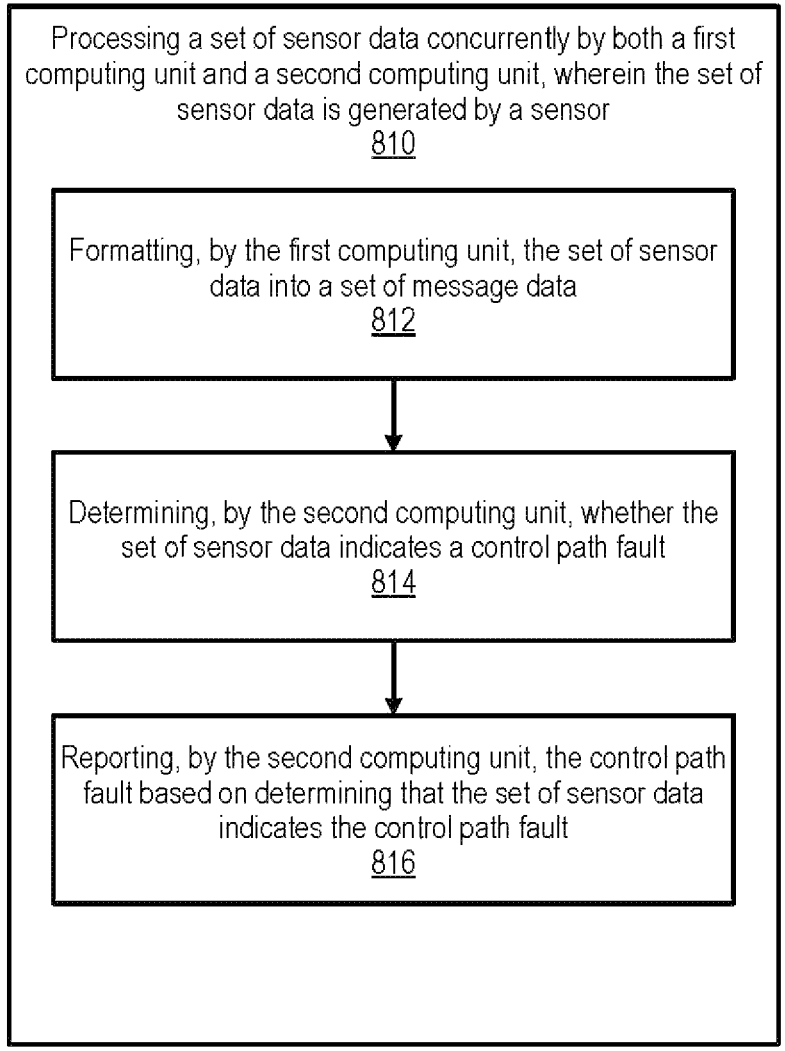
FIG. 8 is a flow diagram illustrating a method to perform dual path Ethernet-based sensor device fault monitoring.

FIG. 8 is a flow diagram illustrating a method to perform dual path Ethernet-based sensor device fault monitoring. Process 800 may be performed by processing logic that may include software, hardware, or a combination thereof. For example, process 800 may be performed by safety computing unit 700 executing on ADDP board 620 as shown in FIG. 7.

At operation 810, processing logic processes a set of sensor data concurrently by both a first computing unit and a second computing unit. The set of sensor data is generated by a sensor. While processing the set of sensor data, at operation 812, the first computing unit formats the set of sensor data into a set of message data. The raw data is generated by a sensor and included in the set of sensor data. Also, while processing the set of sensor data, at operation 814 the second computing unit determines whether the set of sensor data indicates a control path fault. In response to determining that the set of sensor data indicates a control path fault, at operation 816, the second computing unit reports the control path fault accordingly.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
    receiving, at both a first computing unit and a second computing unit, a set of sensor data generated by a sensor, wherein the set of sensor data comprises raw data;
    formatting, by the first computing unit, the raw data into a set of message data;
    determining, by the second computing unit, whether the set of sensor data indicates a control path fault, the control path fault being independent from the raw data; and
    reporting, by the second computing unit, the control path fault responsive to determining that the set of sensor data indicates the control path fault.

2. The method of claim 1, further comprising:
    receiving, at an Ethernet switch, the set of sensor data from the sensor; and
    transmitting, from the Ethernet switch, the set of sensor data to both the first computing unit and the second computing unit over a dedicated virtual LAN.

3. The method of claim 2 wherein the autonomous driving vehicle comprises an autonomous driving system that includes the first computing unit, the second computing unit, and the Ethernet switch.

4. The method of claim 1, further comprising:
    determining, by the first computing unit, whether the set of sensor data indicates a data path fault; and
    reporting, by the first computing unit, the data path fault based determining that the set of sensor data indicates the data path fault.

5. The method of claim 4, wherein the first computing unit reports the data path fault to a central system monitor, and wherein the second computing unit reports the control path fault to the central system monitor.

6. The method claim 1, further comprising:
    determining, by the second computing unit, whether the set of sensor data indicates a link layer fault; and
    reporting, by the second computing unit, the link layer fault based determining that the set of sensor data indicates the link layer fault.

7. The method of claim 1, further comprising:
    generating, by the second computing unit, a set of sensor data statistics in response to evaluating the set of sensor data.

8. A non-transitory machine-readable medium having instructions stored therein, which when executed by at least one processor comprised in a system, cause the system to:

receive, at both a first computing unit and a second computing unit, a set of sensor data generated by a sensor, wherein the at least one processor comprises the first computing unit and the second computing unit, and wherein the set of sensor data comprises raw data;

format, by the first computing unit, the raw data into a set of message data;

determine, by the second computing unit, whether the set of sensor data indicates a control path fault, the control path fault being independent from the raw data; and report, by the second computing unit, the control path fault responsive to determining that the set of sensor data indicates the control path fault.

9. The non-transitory machine-readable medium of claim 8, wherein the system is further to:

receive, at an Ethernet switch, the set of sensor data from the sensor; and transmit, from the Ethernet switch, the set of sensor data to both the first computing unit and the second computing unit over a dedicated virtual LAN.

10. The non-transitory machine-readable medium of claim 9, wherein an autonomous driving system comprises the first computing unit, the second computing unit, and the Ethernet switch.

11. The non-transitory machine-readable medium of claim 8, wherein the system is further to:

determine, by the first computing unit, whether the set of sensor data indicates a data path fault; and report, by the first computing unit, the data path fault based determining that the set of sensor data indicates the data path fault.

12. The non-transitory machine-readable medium of claim 11, wherein the first computing unit reports the data path fault to a central system monitor, and wherein the second computing unit reports the control path fault to the central system monitor.

13. The non-transitory machine-readable medium of claim 8, wherein the system is further to:

determine, by the second computing unit, whether the set of sensor data indicates a link layer fault; and report, by the second computing unit, the link layer fault based determining that the set of sensor data indicates the link layer fault.

14. The non-transitory machine-readable medium of claim 8, wherein the system is further to:

generate, by the second computing unit, a set of sensor data statistics in response to evaluating the set of sensor data.

15. A system comprising:

at least one processing device, comprising:
a first computing unit; and
a second computing unit; and a memory to store instructions that, when executed by the at least one processing device cause the at least one processing device to:

receive, at both the first computing unit and the second computing unit, a set of sensor data generated by a sensor, wherein the set of sensor data comprises raw data;

format, by the first computing unit, the raw data into a set of message data;

determine, by the second computing unit, whether the set of sensor data indicates a control path fault, the control path fault being independent from the raw data; and report, by the second computing unit, the control path fault responsive to determining that the set of sensor data indicates the control path fault.

16. The system of claim 15, wherein the at least one processing device is further to:

receive, at an Ethernet switch, the set of sensor data from the sensor; and transmit, from the Ethernet switch, the set of sensor data to both the first computing unit and the second computing unit over a dedicated virtual LAN.

17. The system of claim 16 wherein an autonomous driving system comprises the first computing unit, the second computing unit, and the Ethernet switch.

18. The system of claim 15, wherein the at least one processing device is further to:

determine, by the first computing unit, whether the set of sensor data indicates a data path fault; and report, by the first computing unit, the data path fault based determining that the set of sensor data indicates the data path fault.

19. The system of claim 18, wherein the first computing unit reports the data path fault to a central system monitor, and wherein the second computing unit reports the control path fault to the central system monitor.

20. The system of claim 15, wherein the at least one processing device is further to:

determine, by the second computing unit, whether the set of sensor data indicates a link layer fault; and report, by the second computing unit, the link layer fault based determining that the set of sensor data indicates the link layer fault.

* * * * *